July 5, 1966
R. J. BROOKS ETAL
3,259,645
CONTINUOUS SULFONATION PROCESS
Filed Dec. 12, 1962
5 Sheets-Sheet 3
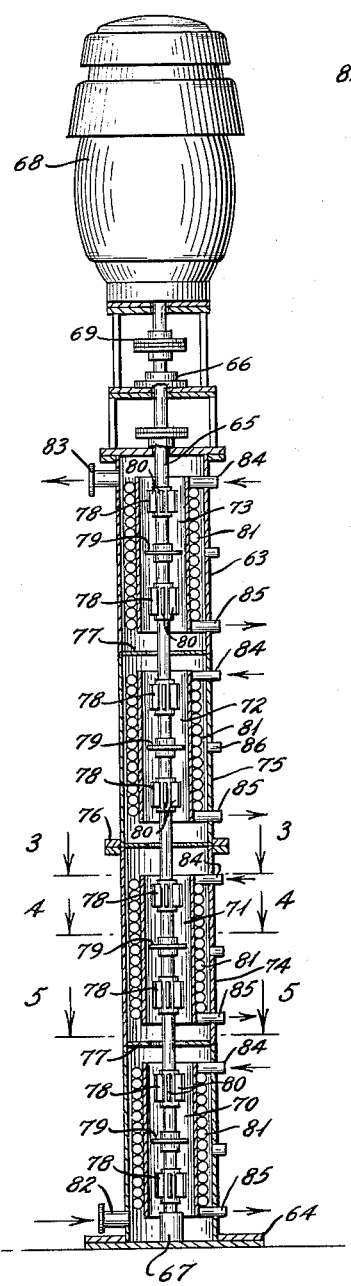
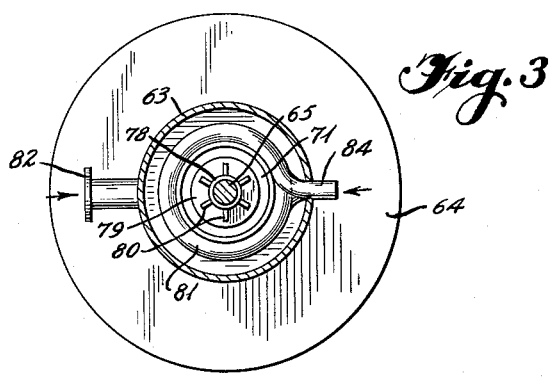
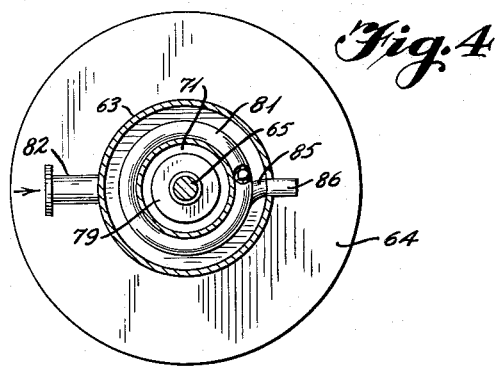
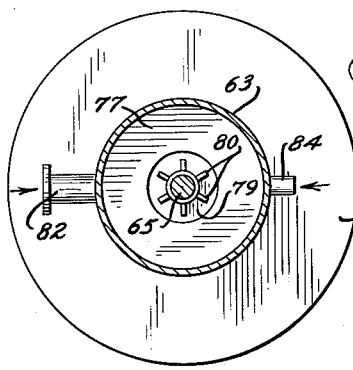
INVENTORS
Richard J. Brooks,
Burton Brooks
BY Sherman & Sherman
ATTORNEYS

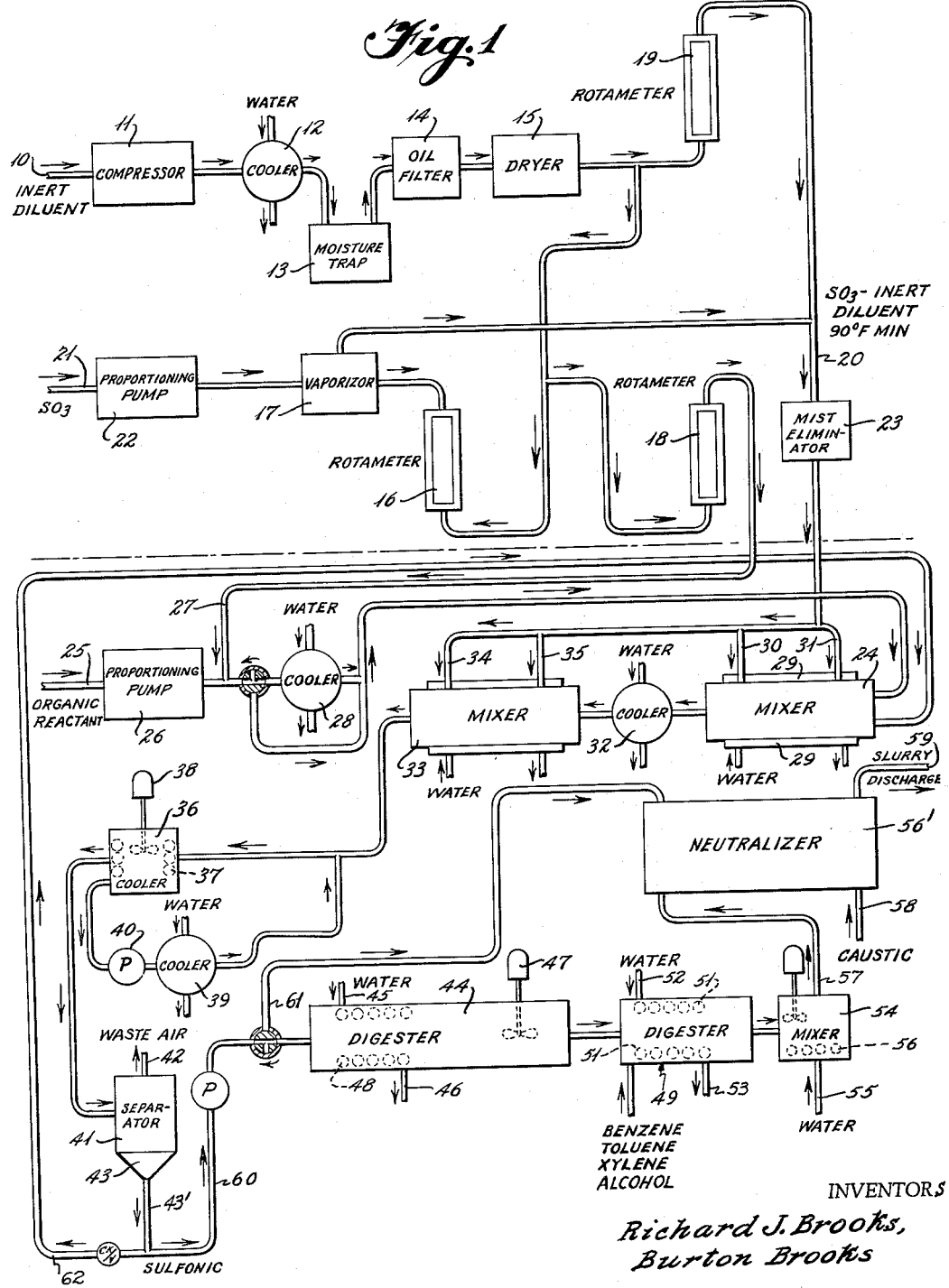

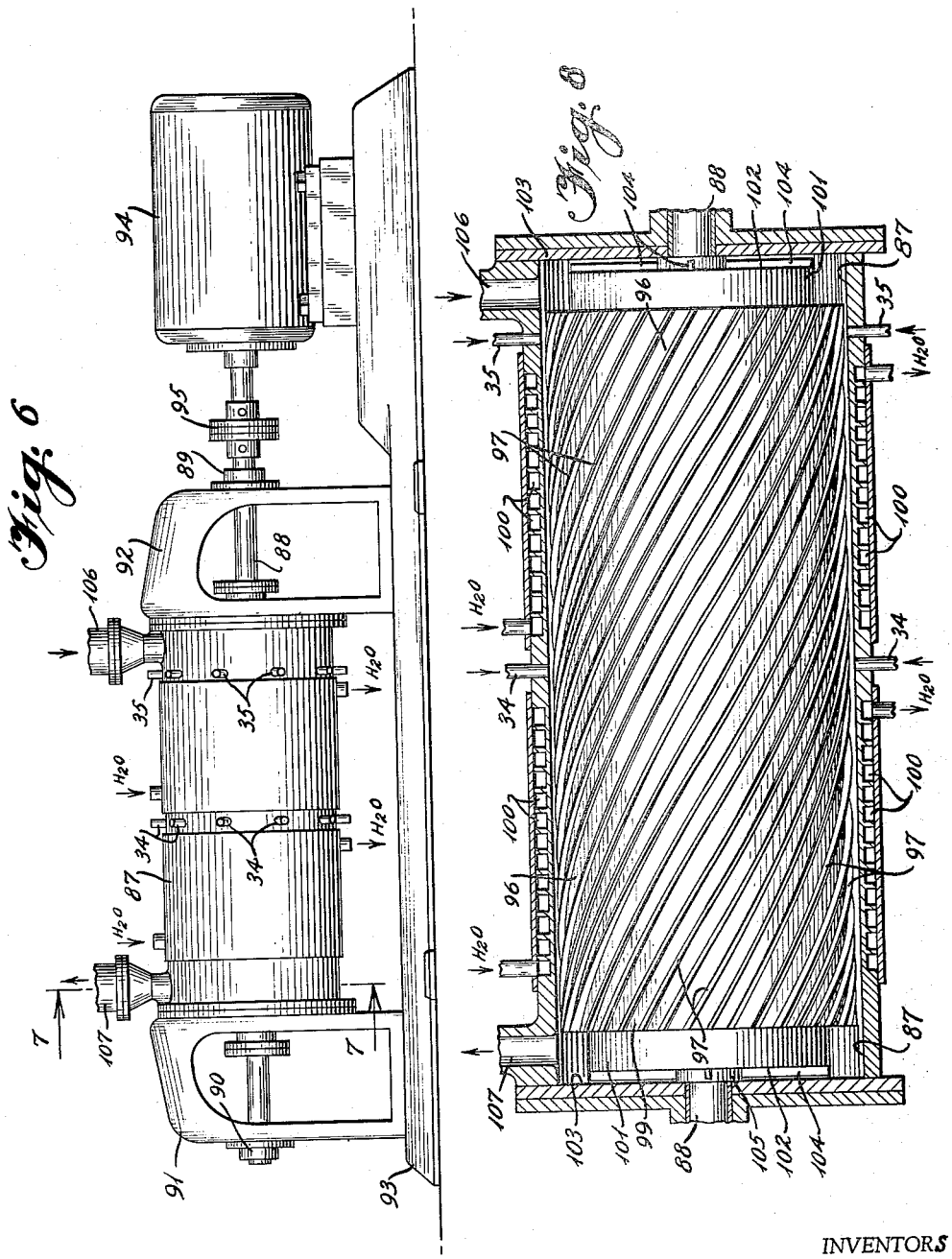

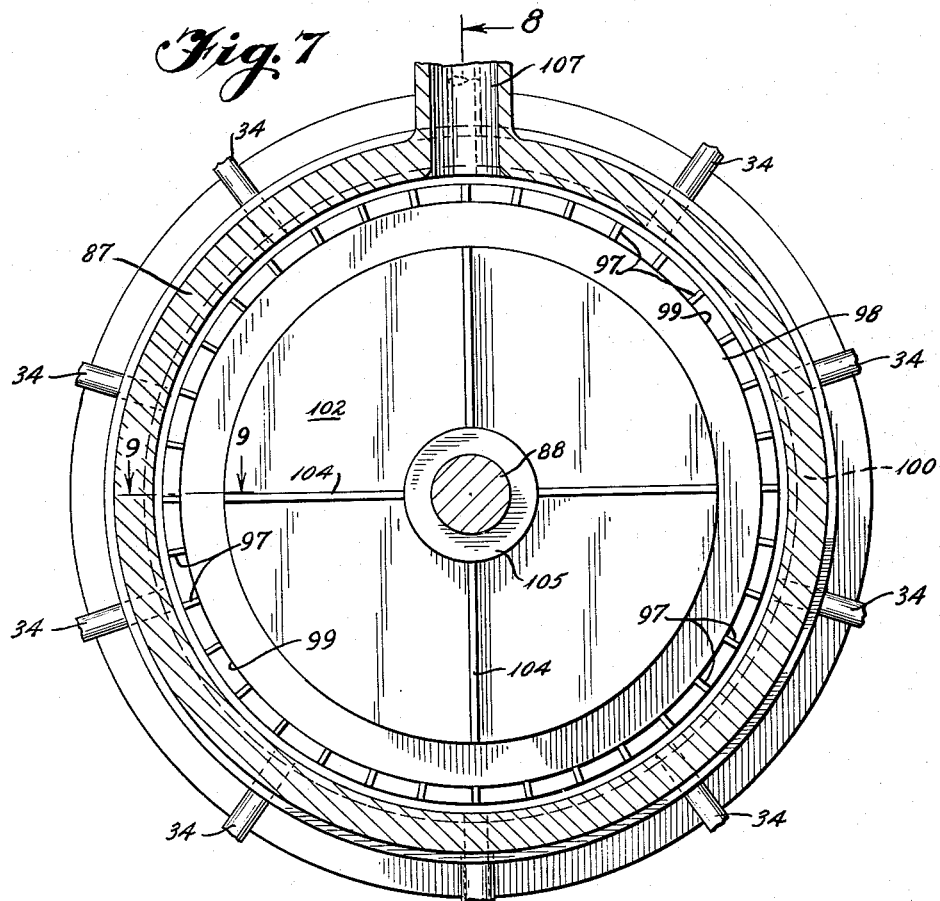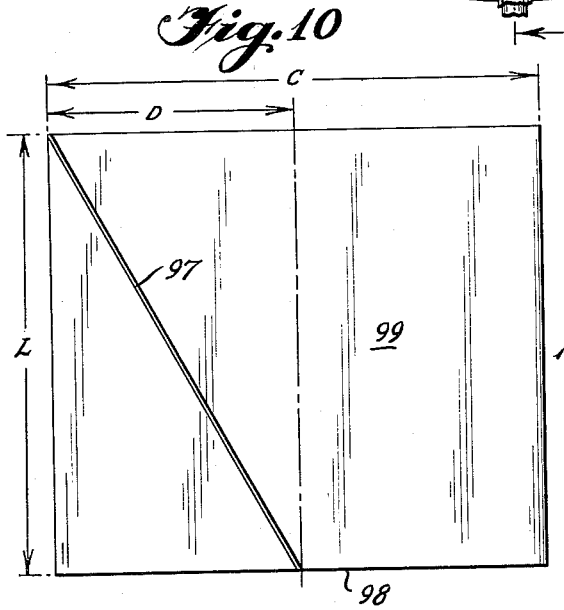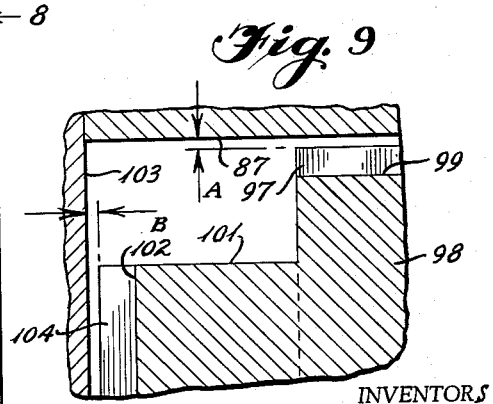

3,259,645
CONTINUOUS SULFONATION PROCESS
Richard J. Brooks and Burton J. Brooks, Seattle, Wash., assignors to The Chemithon Corporation, Seattle, Wash., a corporation of Washington
Filed Dec. 12, 1962, Ser. No. 244,096
16 Claims. (Cl. 260—459)

This invention relates to a process and apparatus for the sulfonation of organic reactants, and relates more particularly to an improved process and apparatus for the rapid and continuous sulfonation of alkyl aryl hydrocarbons, fatty alcohols, ethoxylated alkyl phenols and other sulfonatable organic compounds.

The term "sulfonating," as employed hereinafter in the specification and in the claims, is used sometimes in its generic sense as applying both to true sulfonating and to sulfating, and sometimes in its specific sense, that is, to true sulfonating. Where the context in which the term "sulfonating" is used does not require the specific sense, it is to be construed generically.

Organic sulfonic acids and organic sulfonates are becoming increasingly important due to their use in the preparation of liquid detergents, particularly in the preparation of relatively salt-free detergents having good solubility characteristics. Normally, the sulfonated detergents are prepared by sulfonation processes employing concentrated sulfuric acid or oleum. In such processes, the reaction mixture contains a residue of sulfuric acid and water as a byproduct, so that spent acid results. When neutralizing the so-formed sulfonated product with, for example, sodium hydroxide, the spent acid is neutralized along with the sulfonated product, the spent acid forming sodium sulfate. While the use of sodium sulfate is desirable for some purposes, its use is definitely undesirable for other purposes, particularly in processes for the preparation of salt-free detergents having good solubility characteristics. In the latter processes, the sodium sulfate must be removed.

There has developed a great interest in the production of salt-free detergents by the use of sulfur trioxide due to the facts, on the one hand, that the oleum is in short supply, and, on the other hand, of the necessity for discharging spent acid, both major problems in many of the countries of the world. Sulfur trioxide in stabilized form is highly satisfactory as a sulfonating agent, and it is possible for even the small consumer to buy the same in small drum quantities for use in the preparation of salt-free detergents. A stabilized liquid sulfur trioxide having a more than 99 percent available sulfur trioxide content, sold commercially under the trade name "Sulfan," is useful in the instant invention.

Sulfur trioxide used in the preparation of salt-free detergents may be made in various ways, such as, for example, by carefully metering and burning sulfur and catalytically oxidizing the resultant sulfur dioxide to sulfur trioxide, and thereafter feeding the resultant sulfur trioxide/air mixture directly to the organic reactant to sulfonate the latter. Furthermore, a side stream of converter gas from a sulfuric acid manufacturing plant may be metered and utilized as the sulfonating agent for the organic reactant. Also, $SO_3$ can be prepared by stripping the $SO_3$ gas from concentrated oleum. In accordance with the instant invention, the sulfur trioxide for use in the process of this invention is preferably first diluted with inert gas such as air, nitrogen, carbon dioxide, etc.

Alkyl aryl hydrocarbons are useful in the preparation of liquid detergents of the instant invention, e.g., alkyl aryl sulfonates. However, prior efforts to produce alkyl aryl sulfonates by a batch or semi-continuous sulfur trioxide sulfonation system have been found to be unsatisfactory. Thus, heretofore the major problem in the use of such processes resided in the fact that the producer of the organic sulfonates was unable to obtain a substantially salt-free product of good color in optimum yield, i.e., commercially practicable.

Other disadvantages encountered when employing a batch system for producing organic sulfonates are the inherent difficulties in agitation and temperature control. Many attempts have heretofore been made to modify the batch system to overcome the deficiencies thereof. Thus, for example, one method formerly employed was to cause a tank containing a sulfonation reaction mixture to overflow into a series of tanks in order to make a semi-continuous sulfonation process. The results, however, were not entirely satisfactory in that the quality and yield of the product varied, and/or good color was not obtained.

Prior efforts to develop a sulfur trioxide/air sulfonation process were unsatisfactory in that a yellow or brown colored detergent was generally obtained. This discolored product required bleaching in order to compete with the products obtained by oleum sulfonation, which bleaching step added considerably to the cost of production. Moreover, the resultant bleached product was still substantially inferior in both color and quality to the sulfonates produced by the prior art processes employing oleum.

Gilbert, in U.S. Patent No. 2,723,990, describes one of the prior methods for sulfur trioxide sulfonation by the batch system, wherein a heel of sulfuric acid is added to lower the viscosity of the organic reactant, after which the sulfur trioxide, mixed with air in a concentration of about 5%, is introduced. The difficulty with this system is that the heel of sulfuric acid, to a great extent, overcomes the advantage of the sulfur trioxide process, namely, the obtaining of a substantially salt-free product. Prior to the instant invention, it has not been considered commercially practicable to develop a fully continuous sulfonation process wherein a high degree of purity as well as optimum yields could be obtained.

It is therefore a principal object of this invention to provide a continuous process and a novel apparatus for the sulfonation of organic reactants which are free from the disadvantages of the prior art processes and apparatus., Another object of the present invention is to provide an extensively rapid and fully continuous process for the sulfonation of alkyl aryl hydrocarbons, fatty alcohols and other sulfonatable organic materials.

A further object of the present invention is to provide a fully continuous sulfonation process in which the organic reactants may be continuously fed and the resultant reaction products continuously withdrawn at controlled temperatures and pressures.

Still another object of the present invention is to provide a fully continuous sulfonation process in which there is very little hold-up time in the mixing stages.

A still further object of the present invention is to provide a fully continuous sulfonation process employing multiple mixing stages wherein extremely vigorous mixing is employed in each of the mixing stages, coupled with regulated control of the temperature and pressure in each of the mixers.

Another object of the present invention is to provide a fully continuous sulfonation process employing a multiplicity of mixing stages wherein immediate cooling is effected between each stage, whereby the resulting sulfonated reactant requires no bleaching, and is of good color, odor and purity.

A further object of the instant invention is to provide a controlled method for regulating the amount of sulfonating agent and air entering the system.

A further object of this invention is to provide a novel apparatus for carrying out the processes of this invention.

A still further object is to provide a fully continuous sulfonation process and apparatus that is simple to control and requires a small amount of plant space.

The above-mentioned and other objects and advantages of the present invention will become apparent as the invention is more thoroughly discussed hereinafter.

In contrast to the prior art sulfur trioxide/air processes which resulted in a yellow or brown colored detergent that had to be bleached to compete with the products produced by oleum sulfonation, it has been unexpectedly found in accordance with the present invention that a commercially satisfactory, fully continuous sulfonation process can be successfully carried out if there is careful control of certain of the process variables during sulfonation. The sulfonation process of this invention produces an excellent yield of products which are substantially white, thereby requiring no bleaching.

It has been found also that in order to obtain products with the aforementioned desired characteristics, it is necessary that certain conditions are important in order to achieve optimum reaction results, such as (a) The clearance of the rotor blades in the mixer,
(b) The diameter of the rotor in the mixer,
(c) The length of the mixer,
(d) The number of mixing stages (reaction zones) in the reactor,
(e) The temperature of reaction in each reaction zone,
(f) The removal of the mist in the entering sulfur trioxide gas,
(g) The vigorous agitation in each of the mixing stages,
(h) The extremely short reaction time in each of the mixing stages,
(i) The immediate cooling after each mixing stage,
(j) The digestion of the reaction mixture after leaving the mixing stage while employing vigorous agitation,
(k) The concentration of the sulfur trioxide/inert diluent mixture,
(l) The temperature of the entering sulfur trioxide/inert diluent mixture, and
(m) The method, as well as the number of points, of injection of the reactants into the mixers.

By utilizing the process conditions of the present invention, the products prepared thereby are superior to those heretofore produced in the prior art sulfonation processes employing a wall which has to be scraped of the product. In prior sulfonation processes, such as illustrated in Luntz et al., U.S. Patent No. 2,768,199, employing scraped wall reactors, the sulfonic acid tends to pile up ahead of the impellor blades in the reactor. Accordingly, poor turbulence and diffusion is created in the pile of material moving ahead of the blades of the reactor which results in, for example, poor reaction rates, degradation, and generally poor product quality. Moreover, because of the extreme viscosity of sulfonic acids and also because of the extremely reaction nature of sulfur trioxide, tremendously effective mixing is required to obtain good product quality.

However, in accordance with the present invention, it has unexpectedly been found that by using optimum tolerance in the reactor, the disadvantages of the prior art methods are obviated, resulting in the production of a purer product in higher yield. It has been found that the tolerance between the rotor blades and the stator in the mixer preferably should be within the range of 0.005 to about 0.040 for optimum results.

It has also unexpectedly been found that with the use of multiple mixing stages wherein vigorous mixing is effected in each stage and instantaneous cooling thereafter, the problem of controlling both the viscosity of sulfonic acids as well as the extremely reactive nature of sulfur trioxide which has plagued prior art sulfonation processes was alleviated. In prior art processes when sulfur trioxide is injected into a once-through mixing stage, the reaction is almost instantaneous, with the result that the heat of the reaction causes the temperature of the reaction products to rise very rapidly, causing deterioration and degradation of the final product as well as poor product color. This problem has now been completely overcome in the instant invention by controlling the amount of sulfur trioxide fed into each mixing stage, along with immediate cooling between stages, with the direct result that both the inlet and outlet temperatures of the reactants fed to all the mixers can be accurately controlled. It has been found that each mixing stage should be at least 3 inches in length, but not more than 24 inches between reactant inlet points.

With regard to the feed temperatures of the organic reactants used in the process of the instant invention, when starting, for example, with alkyl benzene or aromatics such as xylene or toluene, it is preferred to first mix the reactants with air and thereafter pass the mixture through a heat exchanger where it is cooled to the lowest practical temperature consistent with the cooling water temperature available at the time of operation of the process. However, when using a fatty alcohol as the organic reactant, such as, for example, lauryl alcohol, which is solid at room temperature, it must be heated to a temperature of about 85° F. whereby the reactant will be melted. Tallow alcohol, when employed, may have to be heated somewhat higher, for example, up to a temperature of 125° F. Furthermore, when a non-ionic, which is liquid at room temperature but very viscous, is employed it has to be warmed somewhat, for example, up to a temperature of 90° F., and maintained at a constant temperature so that when it is metered to the reaction zone through a rotameter, the metering is always accurate. In the process of this invention, it was found useful to use a temperature control storage tank for each of the organic reactants so that they will always be fed to the reaction zone at a constant temperature. Moreover, it has also been found advantageous to employ, for most of the high melting point reactants, a somewhat higher temperature for the first stage of the reaction than when lower melting point materials are being sulfonated.

One of the major problems present in the prior art sulfonation processes has been the inability to control the viscosity of the products at various stages of reaction, with the result that poor product color and low purity were always evidenced in the final product due to the inability to adequately mix the sulfur trioxide with the product. However, this problem has been obviated in the instant process by employing various higher temperatures to control viscosity during the introduction of the reaction mixture to the final mixing stages, coupled with vigorous agitation, and thereafter instantly cooling the reaction mixture. The viscosity of the product-reactant mixtures in the process of this invention is reduced at the higher temperatures, and mixing is more efficient when the reactants come in contact with the sulfur trioxide. Thus, the problem of controlling the viscosity of the reactants is directly related to the temperature in each of the mixing stages, which temperature, in turn, is based upon the quantity of fresh sulfur trioxide used in each of the stages and the temperature at which the reactants enter that stage. Generally speaking, it is desirable to sulfonate at as low a temperature as possible, consistent with keeping the viscosity low enough to get extremely good mixing. Different materials have different viscosities as the reaction progresses, and require different operating temperatures. Fatty alcohols, for example, lauryl and tallow, when sulfated have little viscosity increase as the reaction progresses, and the first stage reaction temperature is about the same as the final temperature. Alkyl benzene, on the other hand, can be introduced at much lower temperatures due to its low melting point, but its viscosity rises excessively as the reaction progresses, and thus the temperature must be allowed to rise considerably in the final stages of reaction.

The number of mixing stages employed is also important since the amount of sulfur trioxide introduced in each mixing stage is dependent upon the total number of mixers employed. The reason for this is that the more mixing stages, up to a point, that are used, the smaller the temperature rise across the mixer, with the result that the reactants are not over-heated, thereby giving a final sulfonated product of optimum quality and quantity, along with good color and purity. When sulfating temperature-sensitive fatty alcohols, more mixing stages are employed to provide a more uniform, lower temperature. With alkyl benzene, on the other hand, where the temperature is to be allowed to rise, fewer mixing stages can be used.

It is well known that, in the prior art sulfonation processes employing only a single mixing stage, complete reaction of the reactants is practically impossible. The reason for this is that, as the reaction progresses, the viscosity of many reactants increases, which, in turn, causes poor mixing unless other conditions in the process are changed. However, prior to the instant invention, no method of successfully controlling the viscosity of reactants by controlling the temperature of same during sulfonation was known. The instant process, by the use of multiple mixing stages, multiple inlets for the addition of fresh sulfur trioxide, vigorous agitation, and immediate cooling after each mixing stage, has successfully given the answer to viscosity control of the reactants in order to produce sulfonated products of superior quality. This use of a multiple stage system, or multiple reactors, makes it possible to carry out the sulfonation process at various temperatures as the reaction progresses. The results obtained when two reactors, or mixing stages, were used were superior to the results obtained when using only one mixing stage. However, when more than six mixing stages, or reactors, were employed, e.g., 8 stages, the results were about the same as when six mixing stages were employed.

While the aforementioned features of the present invention are extremely essential, the most important aspect of this invention is to have the temperature of the reactants sufficiently high for a very short period of time so that excellent mixing can take place due to the lowered viscosity of the reactants. As a result of careful study, it has been found that the viscosity characteristics of the material to be sulfonated are extremely important, and a determination of each material's optimum temperature is essential to obtain superior mixing conditions. It has been found generally that higher temperatures usually result in poor sulfonation products; therefore, it is most desirable to effect the sulfonation at as low a temperature as possible.

For example, in the prior art a maximum temperature of around 120° F. to 130° F. is normally specified for the sulfonation of alkyl benzene having from 8 to 20 carbon atoms in the side chain. When operating at this temperature, the sulfonate formed is extremely viscous and the known methods of agitation are entirely inadequate to obtain high product quality with this high viscosity material. In contradistinction to the known methods employed in the prior art, the instant process, using multi-stage mixers, requires that the reactants be introduced into the final stage, or mixer, at a temperature around 120° F., and the temperature is allowed to rise to as high as 200° F., preferably between 150° and 170° F., during the few seconds in which the material is in the reactor. When using only one mixer, and introducing alkyl benzene at ambient temperature, the temperature will rise to around 200° F. If 2 mixers are employed, with cooling between stages, the final temperature will rise to 150° to 170° F. Better product color will be produced in the latter case than in the former. By allowing the temperature to increase in this manner, it has been found surprisingly that when alkyl benzene is employed as the sulfonatable material there is a very rapid decrease in viscosity when the temperature reaches 140° F. and higher. After vigorous mixing for a second or two at this high temperature, i.e., above 140° F., the material is immediately cooled to a temperature below 120° F. Little degradation was found in the resulting product.

Another feature of this invention which has been found to give a more completely pure sulfonated product is the precooling of the reactants prior to their introduction into the process to as low a temperature as possible, since the lower the temperature of the reaction the better the quality of the final product. As set forth previously, in order to maintain optimum conditions throughout each stage of the process the reaction between the sulfur trioxide and the reactants should take place at as low a temperature as possible until the viscosity of the reactants starts to rise to a high value. When this increased viscosity occurs, the temperature is permitted to rise, keeping the viscosity at a fairly constant value. Accordingly, when alkyl benzene is employed as the reactant, i.e., the material to be sulfonated, the temperature of the material added to the reaction zone may be as low as 0° F. However, when a fatty alcohol is employed as the reactant, the temperature at this point is higher due to the fact that fatty alcohols have a much higher melting point. Other aromatics and aromatic-containing compounds, such as benzene, toluene, xylene, and the like, may be precooled to temperatures similar to that employed for alkyl benzene, if desired.

The reaction time employed in the reactor during each mixing stage ranges from 0.1 second to 10 seconds, with 0.5 second to 2 seconds being the preferred range. Extensive tests have disclosed that if the reactants are in the mixing stage for a longer period of time, product degradation begins to take place. The residence time of the gas in the reactor is much less than that of the liquid. The gas velocities employed have ranged from 75 to 300 feet per second. This gives the gas a residence time of only .01 to .05 second in the normal reactor. Since the liquid is not conveyed by the gas the residence time of the liquid in the reactor is much longer. The residence time of the liquid is effected by the gas velocity, the blade clearance, the pitch of the blades and direction of rotation. If the rotation is in the same direction as the curvature of the blades, the residence time will be longer than when the rotation is counter to the blade curvature. The reaction time thus can be regulated to some degree by the direction of rotation of the mixer.

Another factor causing poor product color has been the presence of a sulfuric acid and/or sulfur trioxide mist in the gaseous sulfur trioxide sulfonating agent when it enters the reactor. This mist can be formed by small traces of moisture remaining in the air reacting with the entering sulfur trioxide to form sulfuric acid droplets, and by allowing the temperature to drop to too low a value. In the instant process, the mist is removed from the sulfur trioxide/inert diluent stream prior to its introduction into the reactor.

Another outstanding feature of the instant invention is the discovery that the reactant, i.e., sulfonatable material, should enter the system with a relatively high velocity in a stream of gas diluent so that none of the sulfur trioxide will diffuse into the entering stream of reactant, where it would be apt to react in a zone where there is not high shear or mixing. Thus, the sulfonatable reactant is always conveyed into the reaction zone with an inert gas stream.

In accordance with the instant invention, the sulfur trioxide enters the system in a controlled stream of inert diluent which gives it added velocity, and at the same time the concentration of the entering sulfur trioxide is also controlled, preferably from about 2% to about 8% by volume. The pressure at which the reactants enter the system is also of importance because if the back pressure of the entering reactants increases, the reactivity of the sulfur trioxide gas also increases. However, in the present invention a relatively low pressure is required for passage of the sulfur trioxide/inert diluent mixture through the system. Normally, the sulfur trioxide/inert diluent stream enters at from 10 to 15 p.s.i.g., with 75 p.s.i.g. close to the maximum pressure allowable. It has been found that pressures above 75 p.s.i.g. are increasingly harmful to the final product quality.

The employment of mole percentage excess of diluted sulfur trioxide is also an important factor in the present invention, particularly with regard to the specific classes of materials which can be sulfonated. For example, when substituted aromatics are employed, e.g., dodecyl benzene, as the material to be sulfonated, an 8 to 10 mole percent excess of sulfur trioxide may be employed. However, when utilizing tridecyl benzene, which does not sulfonate as completely or as readily as dodecyl benzene, a somewhat greater mole excess has to be used, e.g., a 10 to 15 mole excess. A fatty alcohol, when used as the organic reactant, degrades quite easily when side reactions take place; accordingly, a mole excess of from 0 to 6 mole percent of sulfur trioxide should be employed.

Xylene and toluene present a different problem, for these materials form sulfones and the larger the excess of sulfur trioxide used, the more sulfone formation takes place. In order to avoid sulfone formation, it is essential that the sulfonation take place with a deficiency of sulfur trioxide, e.g., 60% sulfur trioxide. The unreacted xylene and toluene may be extracted and recycled back through the process.

Non-ionics such as nonyl phenol present another problem when they are being sulfonated. Thus, it is possible to sulfate or sulfonate a non-ionic on the ring, but ring sulfonates are not desirable as detergents. Therefore, in accordance with the instant invention, ring sulfonation is to be avoided. Accordingly, with non-ionics the mole excess of sulfur trioxide employed should be between 0 to a maximum of 6 percent, depending upon the particular non-ionic.

The number of reaction zones through which the sulfur trioxide/inert diluent mixture is introduced is also of importance. It was found that a purer product of optimum quality is obtained by increasing the number of mixing zones employed, up to a practical limit, e.g., a maximum of 6 reaction zones are employed in the instant process. A plurality of reaction zones is important for the reason that the rate of use of sulfur trioxide/inert diluent mixture can be controlled to such exact amounts that, upon reacting with the sulfonatable materials already in the reactor, the temperature rise across the mixing zone will not be so high as to degrade the final product. Furthermore, care should be taken that each stage through which the sulfur trioxide/inert diluent mixture flows has a multiplicity of inlet points leading directly to the reactor, through which inlet points the sulfonating agent is introduced. These inlet points are adapted to control the amount of sulfonating agent added to the mixture. More sulfur trioxide inlet points reduce localized overheating at the point of injection, and ease the problem of mixing the reactants. The temperature at which the sulfonating agent diluted with inert diluent is introduced into the reactor is generally arount 95° to 120° F.

Another reason why the instant process gives optimum yields is that after all the materials leave the final mixing stage, and prior to their introduction into the digester, the temperature of the reactant stream is rapidly reduced to prevent product degradation. The stream is then freed from the sulfonic acid, and the latter is pumped directly to the digester whereby additional reaction of the acid takes place during the digestion. While the sulfonic acid is in the digester the temperature should be below 135° F. Optimum digestion temperature is between 115° and 125° F. If a digestion temperature of about 135° F. is employed, there will be a somewhat lower sulfate and free oil content in the final product, but the product color will also be inferior. The reaction in the digester is effected much more rapidly if vigorous mixing is employed. The reason for this is that diffusion of the viscous sulfonic acid solution is extremely slow and thereby controls the rate of reaction. When diffusion is aided by agitation the rate at which the reaction takes place increases considerably. When alcohol sulfuric acid is being made it should be neutralized immediately. However, if it is entered into the digester, the period of time it remains therein should be relatively short. The reactions which take place during the digestion of sulfonic acids are relatively complex, but, briefly, there is involved the reaction of sulfonic anhydrides, which are formed during sulfonation, with some of the unreacted hydrocarbon. If left unreacted before subsequent water addition breaks down the anhydride to sulfonic and sulfuric acid, the latter forms sodium sulfate upon neutralization. About 95 to 96% of the reaction takes place in the mixers, and about 1 to 4% takes place in the product cooler before the sulfur trioxide gas is separated, and the final 0.5 to 1.5% of the reaction takes place in the digester. The majority of the anhydride breaks down immediately in the cooling tank, and the rest at a reduced rate in the digester.

The effect of digestion is to lower the inorganic salt content of the neutralized product as well as to reduce the free oil. The addition of small amounts of alcohols, as well as benzene, toluene or xylene, to the last stage of the digester will further cut down the inorganic salt content of the product by their reaction with the anhydrides to form organic sulfonates. Moreover, in order to completely break down all of the remaining anhydrides, a final water addition may be employed. The optimum degree of digestion, or the length of time necessary for complete digestion, is determined on the basis of the characteristics of each material to be sulfonated.

The source of sulfur trioxide used in the instant invention is relatively unimportant. It may be obtained from sulfur burner converter gas or from stabilized liquid sulfur trioxide.

As previously set forth, the inert diluent that is combined with the sulfur trioxide may be any gas that does not react with any of the other components, i.e., air, nitrogen, carbon dioxide, etc.

The present invention is particularly applicable to the sulfonation of substituted hydrocarbon compounds, especially alkyl benzenes having from 8 to 20 carbon atoms, but may also be applied to the sulfonation of other materials such as olefins, and aromatics such as benzene, toluene or xylene and their sulfonic acids. Double sulfonates may also be prepared by the process of this invention. Ethoxylated aromatics as well as fatty alcohols and ethoxylated fatty alcohols, and unsaturated oils such as unsaturated fatty acids are equally operable in the process herein described.

The alkyl benzenes which are utilized in the practice of the present invention are well known in the art, and they and their preparation are disclosed in a large number of U.S. patents, illustrative of which are U.S. Patents Nos. 1,992,160, 2,161,173, 2,210,902, 2,218,472, 2,223,364, 2,220,099, and 2,597,834. Typical examples of such alkyl benzenes which may be employed are octyl benzene, nonyl benzene, decyl benzene, dodecyl benzene, tridecyl benzene, tetradecyl benzene, hexadecyl benzene, octadecyl benzene, nonyl toluene, decyl toluene, dodecyl toluene, tetradecyl toluene, dodecyl xylene, dodecyl ethyl benzene, dodecyl isopropyl benzene and the like. Such alkyl benzenes can be conveniently represented by the formula

wherein R is an alkyl radical, either straight or branched chain, containing at least 8 carbon atoms, and preferably from 8 to 20 carbon atoms.

This invention may be briefly described as a continuous process for sulfonating an organic reactant, such as a compound having an alcoholic hydroxyl, a compound having an olefinic linkage, and a compound having an aromatic nucleus, using a sulfur trioxide/inert diluent mixture. The steps of said continuous process comprise introducing the organic reactant and the sulfur trioxide/inert diluent mixture, in separate streams, into the first of a series of mixers, with vigorous agitation to effect the formation of an instantaneous reaction mixture. The reaction mixture is withdrawn almost immediately from the first mixer and cooled, and then by suitable means the reaction mixture is passed under pressure into a second mixer whereby the sulfonation process continues, as in the first mixer, along with the simultaneous addition of a fresh mixture of sulfur trioxide and inert diluent. The reaction mixture can then further be introduced into other mixers, as previously described. Upon leaving the last mixer the reaction mixture is immediately cooled, and any air-containing unreacted sulfur trioxide is separated from the reaction mixture and the reaction mixture is digested by vigorous mixing, and is then neutralized to give a nearly completely sulfonated product. If the organic reactant is an alcoholic hydroxyl, the digester may be bypassed, and the reaction mixture may be passed directly to the neutralizer.

A more detailed description of the process and apparatus of the present invention will be given with reference to the accompanying drawings in which:

FIGURE 1 diagrammatically illustrates the entire process wherein two mixing stages are employed;

FIGURE 1A illustrates an alternative method of making sulfur trioxide which is thereafter introduced into the system of the present invention;

FIGURE 1B diagrammatically shows the process employing four mixing stages;

FIGURE 2 is a sectional view illustrating the digester useful in carrying out the process of this invention;

FIGURE 3 is a cross-sectional view taken along the line 3—3 of FIGURE 2;

FIGURE 4 is a cross-sectional view taken along line 4—4 of FIGURE 2;

FIGURE 5 is a cross-sectional view taken along line 5—5 of FIGURE 2;

FIGURE 6 is an illustration of one of the mixers employed in the process of this invention, shown in elevation;

FIGURE 7 is a sectional view taken along line 7—7 of FIGURE 6;

FIGURE 8 is a transverse sectional view taken along line 8—8 of FIGURE 7;

FIGURE 9 is a fragmentary enlarged sectional view showing one end of the rotor and stator taken along line 9—9 of FIGURE 7; and FIGURE 10 is a schematic showing of the core of the mixer flattened out to illustrate the spiralling of the mixer blades.

Like reference numerals indicate like parts throughout the several views of the drawings.

Figure 1A:
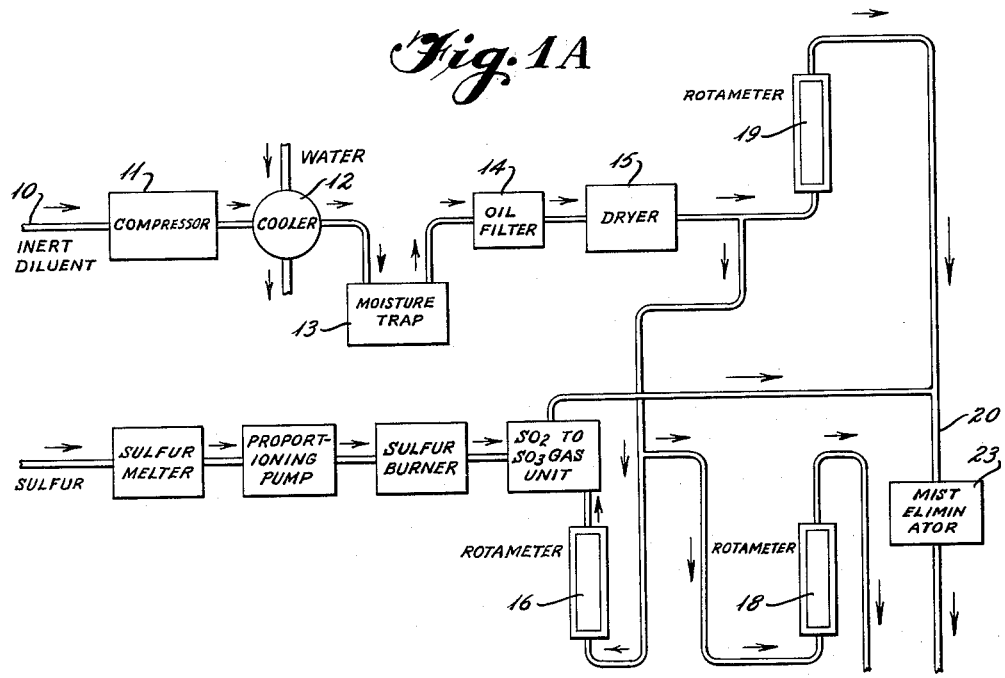

Firstly, with reference to FIGURE 1, which schematically illustrates the process of the present invention, a continuous stream of inert diluent (e.g., air, nitrogen, etc.), entering the system through pipe 10, flows through compressor 11 wherein the inert diluent is compressed to the desired pressure. Thereafter, the compressed inert dilent flows to the cooler 12. The compressed, cooled inert diluent then flows into moisture trap 13, wherein excess water is removed, thereafter to oil filter 14 to remove other impurities, especially free oil and dust, next to a dryer 15, whereby the compressed inert diluent is dried prior to passage into the sulfonation zone. The inert diluent leaving dryer 15 is split into two streams, one of which goes through rotameter 16 and then to the sulfur trioxide vaporizer 17. The other of said streams goes through a rotameter 18 and thereafter is mixed with the incoming organic reactant materials entering through pipe 25. The major portion of the inert diluent entering through pipe 10 goes through rotameter 19 and to the vaporized sulfur trioxide/inert diluent stream 20, in order to further dilute the sulfur trioxide to the proper value, prior to its entry into the first mixer 24. Sulfur trioxide entering the system through pipe 21 is introduced into the proportioning pump 22 and passes to the vaporizer 17, wherein inert diluent is introduced as heretofore described, thereafter is fed under pressure into the stream 20 for further dilution, and then through the mist eliminator 23 before entering the first mixer 24.

The organic reactant is introduced into a proportioning pump 26, wherein it is mixed with inert diluent entering through pipe 27. The organic reactant/inert diluent mixture passes through cooler 28, under pressure, to the first mixer 24. For the purpose of effecting further cooling, i.e., to remove a portion of the heat of reaction, the mixer 24 is provided with a water jacket 29. The sulfur trioxide/inert diluent mixture enters mixer 24, through multiple inlets at 30 and 31, and the two mixtures are subjected to vigorous mixing. When the organic reactant is an alkyl benzene, for example, the temperature in the mixer 24 is allowed to rise under controlled conditions to approximately 140° F. When the reaction mixture leaves the mixer the reaction is about 60% completed. The reaction mixture is then passed through cooler 32 where it is cooled to 120° F. in a matter of seconds, and into a second mixer 33. Additional sulfur trioxide/inert diluent mixture is continuously introduced into mixer 33 through multiple inlets 34 and 35, and further vigorous mixing is effected. The temperature of the reaction mixture passing into mixer 33 is approximately 120° F., and, under controlled conditions, is allowed to rise to a temperature within the range of 150° to 180° F. before it leaves mixer 33. The entire reaction mixture in mixer 33 is immediately passed to a cooled mixing tank 36 and is instantaneously drowned in a large mass of sulfonic acid which is cooled by coils 37. Additional cooling is effected, if desired, by recycling the sulfonic acid through cooler 39. Thereafter, the said sulfonic acid is passed by pump 40 back into cooler 36. The total time which the reaction mixture is in any of the mixers is extremely short, that is, on the order of a few seconds. The amount of time required to cool the reaction mixture after it leaves the mixer and enters the cooler should be short as well, preferably only a few seconds. The mixture of cooled sulfonic acid and air leaving cooler 36 is introduced into a centrifugal separator 41, whereby waste air containing a small portion of sulfur trioxide is removed through outlet 42. The sulfonic acid exits from the bottom of separator 43 through pipe 43', and enters a digester 44, wherein it passes through a series of compartments, to minimize backmixing, at temperatures below 135° F. for a period up to 30 minutes.

If desired, the sulfonic acid stream coming from separator 41 may be split into two streams. One of said streams is recycled through pipe 62 back to mixer 24, and the other of said streams is passed to digester 44 by means of pipe 60. Digester 44 is cooled during the mixing stages by means of cooling coils 48, and cold water is continuously added by way of inlet 45 and removed through outlet 46. During this stage of the reaction approximately 0.5 to 1.0% of the original organic reactant reacts with the sulfuric anhydride formed in the process. The sulfonic acid mixture in digester 44 is transferred to a second digester 49, wherein 1 to 2% by weight of sulfonatable reactant, such as benzene, toluene, xylene, or alcohol, is simultaneously introduced and added to the sulfonic acid mixture and further digestion is effected.

When employing an alcoholic hydroxyl as the organic reactant, the digester may be bypassed, as at 61, and the reaction mixture sent directly to neutralizer 56. Digester 49 is cooled by coils 51 and cold water is continuously added through inlet 52 and removed through outlet 53. Most of the remaining acid is removed in the second digester and the resulting product is passed to a mixer 54 where it is mixed with water, which enters through inlet 55, to decompose any remaining anhydrides. Mixer 54 is equipped with internal cooling coils 56 to maintain a controlled temperature. The resulting product is removed from the mixer 54 to the neutralizer 56' through pipe 57, to which neutralizer caustic soda is added through inlet 58 to obtain the desired pH. Thereafter, the sulfonated product is discharged as neutralized slurry through outlet 59.

FIGURE 1A illustrates an alternative method for introducing sulfur trioxide into the novel system of the present invention. The air supply used here is the same as that described above. However, here sulfur is fed into a sulfur melter and then to a proportioning pump, wherein the molten sulfur is proportioned into the sulfur burner simultaneously with the air stream to form sulfur dioxide which is further catalytically oxidized to sulfur trioxide by conventional methods well known in the art.

Figure 1B:
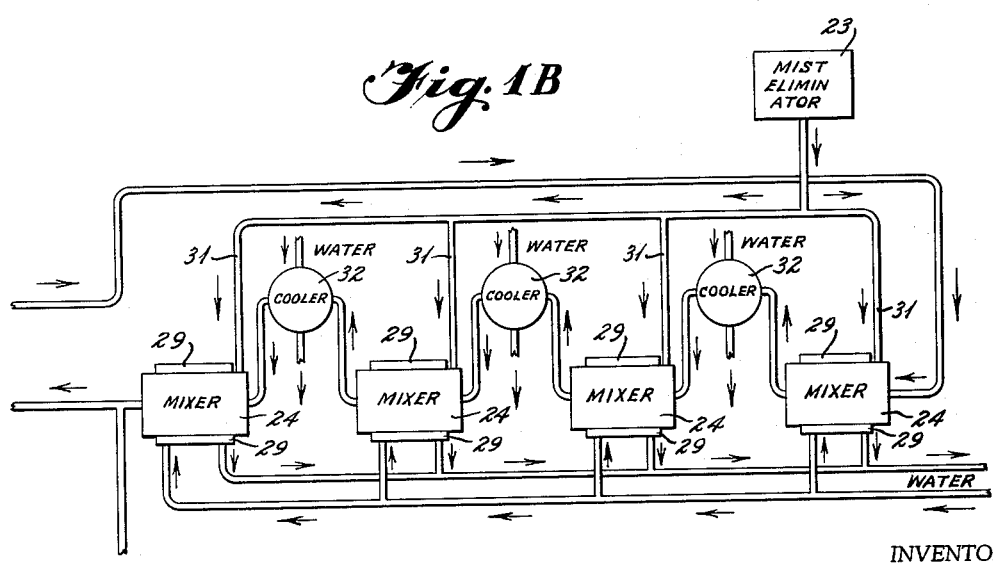

FIGURE 1B illustrates exactly the same process as described in FIGURE 1 above, with the exception that four mixers are employed instead of two.

Referring now to FIGURE 2, the digester which may be employed in this invention is shown. This digester comprises an elongated cylindrical vessel or drum 63 suitably mounted on a supporting base 64. As clearly shown, a rotatable shaft 65 is mounted within the vessel by means of conventional bearings 66, 67, and extends the entire length thereof. The shaft 65 is operatively connected to a conventional motor 68 by means of coupling 69. The digester employed in the process of the instant invention also includes a series of compartments 70, 71, 72 and 73 within a common housing, suitable agitating means being provided in each of said compartments. The vessel comprises two sections 74 and 75 fastened together by conventional couplings 76. Each section is provided with two independent compartments 70, 71, and 72, 73, spaced from each other by means of stationary baffles 77.

In accordance with this invention, the necessary agitation in each compartment is provided by a pair of spaced impellers 78 and a rotary baffle member 79, each mounted on the rotatable shaft 65. Preferably, each impeller is provided with six vanes 80, as clearly shown in FIGURES 3 and 5. Each compartment of the digester is also provided with a circumferential cooling jacket 81 utilizing water as the cooling medium, which jackets are spaced from the agitating means and positioned adjacent the inner walls of each compartment. In order to connect the digester into the reaction system, a suitable inlet 82 and an outlet 83 are provided. Furthermore, each individual compartment is provided with necessary inlets 84 to supply the water cooling medium to the cooling jackets. Suitable outlets 85 are also provided for the removal of said cooling medium. Each compartment is also provided with water-addition inlet 86 to break the anhydride, or for the introduction of the toluene, etc., to react with the excess acid present. Normally, the first stage (compartment 70) is for digestion alone, no additional reactants being added, and the next stage (compartment 71) is for the addition of an aromatic such as toluene, etc., with further digestion taking place. The last addition inlet (compartment 73) is for the entry of water to break the anhydride present. The addition inlet 86 in compartment 72 is for the optional introduction of water or the aromatic. In accordance with this invention, a maximum of two addition inlets are required (such as compartments 70 and 73), but more addition inlets may be utilized for greater flexibility.

As previously set forth, the most important feature of the process of the instant invention is the extremely effective mixing and cooling of the reaction mixture. It has been found that the desired mixing may be obtained by utilizing a novel mixer which will be described in detail hereinafter.

Referring now to FIGURES 6 to 8, wherein one of the novel mixers of the instant invention is shown, each mixer comprises a horizontally elongated housing, or stator, 87, a horizontally disposed shaft 88 being journalled in bushings within end walls of the housing and extending beyond each end thereof. The extremities of the shaft 88 are rotatably supported in a conventional manner by means of bearings 89 and 90 in a pair of supporting members 91 and 92 affixed to the opposite ends of stator 87 and to a common base 93. As shown in FIGURE 6, a conventional motor 94 is used to drive the shaft 88 by means of a friction clutch 95.

The mixer of the instant invention includes a rotor 96 adapted to be fixed to and rotated about the shaft 88. As clearly shown in FIGURES 7 and 8, a plurality of rotor blades 97 are equally spaced on the central core 98 of rotor 96 and spiral, or curve, over the surface 99 of said core. These blades 97 reflect the reaction mixture in reverse direction to the rotation of the rotor 96, providing minimum hold-up time. Surrounding the rotor is the stator, or housing, 87. A plurality of cooling jackets 100 are also positioned about the circumference of said stator 87.

In accordance with this invention, and for the obtainment of optimum mixing results, the outside diameter of the rotor core 98 should have a maximum clearance of ¼ inch from the inner wall of the stator 87. Additionally, it is essential that the spiralling rotor blades 97 be between ⅟₁₆ and ⅛ inch in depth and have a clearance of from .005 to .040 inch from the inner wall of the stator. As previously set forth, the minimum clearance between the blade and the stator is to prevent the material from piling up ahead of the blade, which would result in poor mixing. Only within these specified limits do desired conditions of high shear prevail. As an example, it has been found that inadequate mixing occurs when the blades are spaced more than 4 inches apart when an 8-inch diameter mixer turning at 1750 r.p.m. is used, at which speed the rotary blade speed is at a minimum of 80 feet per second. Moreover, for very small mixers the blade spacing should be at most 90° apart. Furthermore, the desired mixing is obtained when the rotor blades spiral over the rotor core surface from end to end along the length of the rotor core, making at most a spiral one half the circumference of the rotor core surface, as clearly shown in FIGURE 10.

The rotor core 98 has its end portions 101 further turned down to a diameter less than the diameter of surface 99, and to a desired depth from the ends 102 of rotor core 98. The stator, or housing, 87 includes circular end flanges 103 positioned at and spaced from each end 102 of the rotor core 98, as seen in FIGURES 8 and 9. Radially fixed to each end 102 are end baffles 104 extending from a central hub 105 to the outer surface of end portion 101, the purpose of which will be described hereinafter.

The present mixer employs suitable inlet and outlet ports 106 and 107 for introduction of ingredients to the mixer and for discharge from the same. The reduced end portions 101 of the rotor core 98 are in direct line with the inlet and outlet ports 106 and 107, allowing for a more steady flow of ingredients into the mixing chamber and distribution of the same around and along the surface 99 of the rotor core 98. The end baffles 104 function to keep the rotor ends free of any friction or pressure build-up of material between the ends of the rotor and the end plates or flanges 103, which would cause a slow down or drag on the rotor and motor.

The purpose of the specific design of the mixer is to obtain high-shear mixing with a minimum of hold-up time. To this end it is essential that the core of the rotor extend to within ¼ inch of the housing wall so that the hold-up in the reactor is exceedingly short.

Referring specifically to FIGURES 6 and 8, it should be noted that the mixer is provided with two planes of injection 34 and 35 spaced from each other. Preferably, a minimum of six sulfur trioxide inlet ports are employed at each injection plane, thereby providing at least twelve inlet ports per mixer.

It has been discovered that the mixer should be at least 3 inches in length for adequate reaction time. When the mixer is larger than 24 inches, the pressure drop becomes excessive.

The specific relationship of the rotor blades to the inner wall of the stator for efficient operation of the mixer is clearly illustrated in FIGURE 9. The blade clearance indicated at A and B should be from .005 to .040 inch for the proper shearing action. Furthermore, the distance between the rotor core surface 99 and the inner wall of the stator 87 should be no more than ¼ inch.

Referring now to FIGURE 10, the circumference C of the outer surface 99 of the rotor core 98 is shown in a flattened condition in order to illustrate the angling of the blades 97 on the surface 99. The blades 97 are disposed at an angle to the axis of the rotor core 98 one half the circumference C, as shown at D, over the full length L of surface 99 of rotor core 98. As previously pointed out, a more effective mixing in the mixer is obtained when the rotor blades 97 spiral along the full length, but no more than one half the circumference of surface 99 of rotor core 98.

The mixer described hereinabove may also be employed in oleum or sulfuric acid sulfonation, and the adsorption of sulfur trioxide in sulfuric acid to make oleum. The mixer would also be useful for many chemical reactions where intimate mixing is desired.

In order to further disclose the present invention, the following examples are illustrative of the practice of the invention. It will be understood, of course, that numerous other examples will readily occur to those skilled in the art in the light of the guiding principles and teachings set forth herein. The examples, therefore, are not to be construed as restricting in any manner the proper scope of the invention.

*Example 1*

Alkyl benzene, having from 8 to 18 carbon atoms, with a nominal value of 13 carbon atoms in the side chain, was sulfonated with sulfur trioxide derived from stabilized $SO_3$. An air/sulfur trioxide mixture entered a reactor at 98° F. under a pressure of 35 pounds per square inch gauge. The $SO_3$ concentration in the air was 5% by volume. Twelve percent excess $SO_3$ over theoretical was employed for the sulfonation. Before the air/sulfur trioxide mixture entered the reactor, it was passed through a mist eliminator which removed any sulfuric acid fog from the stream. In this example, six mixers were employed and the air/sulfur trioxide stream entered through four inlets in each mixer. The alkyl benzene entered at ambient temperature in a stream of cooled air. The total reaction time in the six mixers was 30 seconds. The reactor had a maximum clearance of .01 inch. The temperatures prevailing in each of the six mixers were as follows:

| Stage | Entering, ° F. | Leaving, ° F. |
| --- | --- | --- |
| I | Ambient | 110 |
| II | 90 | 120 |
| III | 90 | 120 |
| IV | 95 | 120 |
| V | 110 | 135 |
| VI | 120 | 150 |

After leaving the sixth reactor, the mixture of sulfonic acid and air, with a little excess $SO_3$, was immediately cooled in a tank containing cool sulfonic acid. The temperature in the tank of the sulfonic acid was 120° F. and the entering mixture was immediately mixed into this large mass of acid and was diluted and cooled to 120° F. almost instantaneously. A mixture of air (with some $SO_3$ remaining in it) and sulfonic acid was removed from this tank and passed to an air separator, where the air/sulfur trioxide mixture was removed and passed to waste, and the sulfonic acid dropped out to the bottom. The separated sulfonic acid was then digested in a violently agitated mixer with multpile compartments for 12 minutes, after which 1% xylene, based on the originally entering alkyl benzene, was added and digested for an additional 12 minutes. Following this final digestion, a small amount, approximately 2% based on the originally entering alkyl benzene, of water was added to break the anhydrides formed during the reaction, and the mixture was then neutralized with caustic soda. The analysis of the product was as follows:

Free oil—1.3% on the basis of active ingredient.
Color—75 Klett for a 5% solution and a 40 mm. light path, using No. 42 blue filter.
Ratio of active ingredient to sodium sulfate—98.5/1.5.

*Example 2*

Alkyl benzene, having from 8 to 18 carbon atoms, but with a nominal value of 12 carbon atoms in the side chain, was sulfonated with $SO_3$ derived from vaporized stabilized sulfur trioxide. The air stream had 6% $SO_3$ by volume, and an excess of $SO_3$ over theoretical of 8% was employed. In this example, only four reaction stages were used, with six inlets in each of the four stages. The air/sulfur trioxide stream entered as set forth in Example 1 at 98° F., and the alkyl benzene entered at 50° F. The reactor was otherwise the same as to clearance of the rotor and the stator, as in Example 1. The temperatures prevailing in each of the four stages were as follows:

| Stage | Entering, ° F. | Leaving, ° F. |
| --- | --- | --- |
| I | 50 | 110 |
| II | 90 | 120 |
| III | 90 | 135 |
| IV | 120 | 180 |

The total reaction time in the four stages was 10 seconds. After leaving the reactor, 1% xylene was injected and the rest of the processing was the same as in Example 1 except that no water was injected. Analysis of the product was as follows:

Free oil—1.3% on the basis of active ingredient.
Color—60 Klett.
Ratio of active ingredient to sodium sulfate—97/3.

*Example 3*

In this example, commercial xylene containing some of each of the isomers was sulfonated with $SO_3$ prepared by vaporizing stabilized liquid sulfur trioxide. The $SO_3$ concentration in the air was 6% by volume and no excess $SO_3$ was employed. Four mixers were used, as in Example 2, and the xylene entered with a stream of air at 40° F. Temperatures in each of the four stages were as follows:

| Stage | Entering, ° F. | Leaving, ° F. |
| --- | --- | --- |
| I | 40 | 90 |
| II | 60 | 100 |
| III | 70 | 120 |
| IV | 90 | 130 |

Because the xylene sulfonate was less viscous than alkyl benzene sulfonate, it was run at a lower temperature in the final stage and adequate mixing still was obtained.

After leaving the reactor, the reaction mixture was again cooled to below 120° F. by mixing in a tank of recycled sulfonic acid, as in Example 1. After cooling, the xylene sulfonate was separated from the air stream in a separator. The xylene sulfonate mixture was digested for 12 minutes in a digester, as set forth in Examples 1 and 2. The exit air/sulfur trioxide stream was passed through an adsorber to remove free xylene. The other details of the processing are the same as set forth in Example 1, and the xylene sulfonic acid was neutralized with sodium hydroxide or ammonium hydroxide. The analysis of the neutralized product showed no free xylene, and an ether extractable content of around 4½%.

*Example 4*

Lauryl alcohol containing about 95% $C_{12}$ atoms was sulfated with sulfur trioxide gas prepared by vaporizing $SO_3$ from stabilized liquid sulfur trioxide. The $SO_3$ entered in an air stream containing 4% sulfur trioxide by volume and 1.02% excess sulfur trioxide over theoretical was employed. Two mixers were used, and the sulfur trioxide/air stream entered in two inlets in each mixer. The alcohol entered at 85° F. because of its melting point. The temperatures in each of the two stages are as follows:

| Stage | Entering, °F. | Leaving, °F. max. |
|---|---|---|
| I | 85 | 105 |
| II | 80 | 105 |

The sulfonic acid mixture leaving the reactor is immediately cooled to below 100° F. in the surge pot, as in the other examples. In this example, however, no digestion was employed and no other ingredients were added. Following the separator, the acid was passed directly to the neutralizer where it was neutralized with a neutralizing agent. Three parts of the sulfonic acid per each part of reacted lauryl alcohol was recycled to the first mixer to cool the mixture. The product, after neutralization, had a color of 100 Klett, based on a 5% solution, and an unreacted alcohol content of about 3% on the active basis.

*Example 5*

Alkyl benzene having from 8 to 18 carbon atoms, but with an average of 12 carbon atoms, was sulfonated. Two mixers were employed with 4 injection planes; that is, there were 2 sets of 6 injection points for the air/sulfur trioxide mixture in each mixer. The air stream had 5% by volume of $SO_3$, and an excess of 10% over theoretical was employed. The air/sulfur trioxide stream entered at 98° F. and the alkyl benzene was cooled to 35° F. before entering the reactor. The reactors had the same clearance as in the previous examples. The temperatures in the 2 stages were as follows:

| Stage | Entering, °F. | Leaving, °F. |
|---|---|---|
| I | 35 | 125 |
| II | 90 | 180 |

The total reaction time in the 2 stages was 6 seconds. Immediately after leaving the second stage, the sulfonic acid was cooled to 120° F., and the remaining process was the same as Example 1. Product analysis is as follows:

Free oil—1.2%
Color—80 Klett

*Example 6*

Tallow alcohol was sulfated in a 6-stage reactor as in Example 2. Due to its higher melting point, the tallow alcohol entered at 130° F., but due to the lower viscosity of the acid, the temperature in the final stages was maintained at a lower value. The temperatures were as follows:

| Stage | Entering, °F. | Leaving, °F. |
|---|---|---|
| I | 130 | 145 |
| II | 130 | 145 |
| III | 115 | 140 |
| IV | 115 | 140 |
| V | 110 | 130 |
| VI | 110 | 125 |

After leaving the sixth stage, the temperature was reduced to 115° F. and the acid passed directly to the neutralizer without digestion or water dilution. The product analysis is as follows:

Unreacted alcohol—4.0 (active basis)
Color—95 Klett
Ratio of active ingredient/sodium sulfate—98/2

It is to be understood that the foregoing detailed description is given merely by way of illustration and that many variations may be made therein without departing from the spirit of this invention.

What is hereby claimed and desired to be secured by Letters Patent is:

1. A continuous process for substantially completely sulfonating a sulfonatable organic reactant selected from the class consisting of olefins, aromatic hydrocarbons, unsaturated fatty acids and compounds having an alcoholic hydroxyl, which comprises introducing into a first reaction zone (1) a stream of a mixture of sulfur trioxide and an inert diluent, and (2) a stream of said organic reactant to produce a reaction mixture, vigorously mixing and maintaining said reaction mixture in said first reaction zone, for not more than about 10 seconds, in the form of a film thereof having a thickness of from .005 inch to about .040 inch, the said mixing being effected by conditions of high shear, immediately passing said reaction mixture into a first cooling zone, introducing the cooled reaction mixture together with a fresh stream of sulfur trioxide and inert diluent into a second reaction zone, subjecting the resultant reaction mixture to vigorous mixing as in the first reaction zone, immediately passing said reaction mixture from said second reaction zone into a second cooling zone, withdrawing the cooled reaction mixture from said second cooling zone and subsequently separating inert diluent containing any unreacted sulfur trioxide from said reaction mixture.

2. A process according to claim 1, wherein any mist present in the stream of sufur trioxide and inert diluent is removed therefrom before said stream of sulfur trioxide and inert diluent enters a reaction zone.

3. A process according to claim 1 wherein the alcoholic hydroxyl is a fatty alcohol having from about 8 to 20 carbon atoms and wherein the temperature in the reaction zones is maintained within the range of about 85° F. to 145° F. and not above about 135° F. after the reaction is more than about 60% complete.

4. A process according to claim 1 wherein the alcoholic hydroxyl is an ethoxylated alkyl phenol and wherein the temperature in the reaction zones is maintained within the range of about 90° F. to 180° F. and is at least 120° F. after the reaction is more than about 60% complete.

5. A process according to claim 1 wherein the organic reactant selected from the group consisting of compounds having olefinic linkage and compounds having an aromatic nucleus and wherein the temperature in the reaction zones is maintained within the range of about 80° F. to 200° F. and is at least 120° F. after the reaction is more than about 60% complete.

6. The process of claim 1 wherein the concentration of sulfur trioxide in the inert diluent is in the range of about 2% to 8% by volume, at a pressure of at most about 75 pounds per square inch.

7. A continuous process for sulfonating a sulfonatable organic reactant selected from the group consisting of olefins, aromatic hydrocarbons, unsaturated fatty acids and compounds having an alcoholic hydroxyl with sulfur trioxide, which comprises introducing into at least one externally cooled reaction zone (1) a stream of said organic reactant and (2) a stream of a mixture of sulfur trioxide and a gaseous inert diluent, to produce a reaction mixture in said reaction zone, vigorously mixing and maintaining said reaction mixture in said reaction zone, for not more than about 10 seconds, in the form of a film thereof having a thickness of from .005 inch to about .040 inch, the said mixing being effected by conditions of high shear, removing said reaction mixture from said reaction zone, and immediately introducing said reaction mixture withdrawn from said reaction zone into a cooling zone to effect a rapid cooling of said reaction mixture and provide a substantially non-degraded sulfonic acid-rich mixture.

8. A process according to claim 7 wherein the concentration of sulfur trioxide in the gaseous inert diluent is in the range of 2% to 8% by volume, at a pressure of at most 75 p.s.i.

9. A process according to claim 7 wherein the organic reactant is selected from the group consisting of olefins, aromatic hydrocarbons, and unsaturated fatty acids and wherein subsequent to cooling of the sulfonic acid rich reaction mixture, the said reaction mixture is digested in an agitated digestion zone.

10. A process according to claim 7 wherein the sulfonatable organic reactant is an alcoholic hydroxyl compound and wherein subsequent to cooling of the sulfonic acid rich reaction mixture, the said reaction mixture is directly neutralized.

11. A continuous process for sulfonating a sulfonatable organic reactant selected from the class consisting of olefins, aromatic hydrocarbons and unsaturated fatty acids, employing a diluted mixture of sulfur trioxide and inert diluent, which comprises simultaneously and continuously introducing an air-diluted stream of said organic reactant and a stream of said sulfur trioxide and inert diluent mixture, without premixing said streams, into the first of at least two reaction zones to produce a reaction mixture in said first reaction zone, vigorously mixing and maintaining said reaction mixture in said first reaction zone, for not more than about 10 seconds, in the form of a film thereof having a thickness of from .005 inch to about .040 inch, the said mixing being effected by conditions of high shear, immediately and continuously withdrawing the resultant reaction mixture from said first reaction zone and passing said reaction mixture as a stream into a cooling zone, introducing the cooled reaction mixture into a second reaction zone wherein vigorous mixing is effected as in the first reaction zone and while simultaneously adding thereto a fresh stream of sulfur trioxide and inert diluent, immediately passing the resultant reaction mixture from said second reaction zone of vigorous mixing to a second cooling zone, withdrawing the cooled reaction mixture from said second cooling zone, separating inert diluent containing any unreacted sulfur trioxide from the reaction mixture, and thereafter permitting the cooled reaction mixture to digest while vigorously mixing the same.

12. A continuous process for substantially and completely sulfonating fatty alcohol compounds having from about 8 to 20 carbon atoms, employing a diluted sulfur trioxide/air mixture, which comprises introducing into the first of at least two reaction zones, at a temperature within the range of about 85° F. to 145° F., (1) a stream of said fatty alcohol and (2) a stream of sulfur trioxide and air, the stream of sulfur trioxide and air entering at a temperature of about 90° F. to 110° F., to produce a reaction mixture in said first reaction zone, vigorously mixing and maintaining said reaction mixture in said first reaction zone, for not more than about 10 seconds, in the form of a film thereof having a thickness of from .005 inch to about .040 inch, the said mixing being effected by conditions of high shear, removing said reaction mixture from said first reaction zone and immediately passing the said reaction mixture to a cooling zone, introducing the cooled reaction mixture into a second reaction zone while simultaneously adding thereto a fresh stream of sulfur trioxide and air, subjecting the resultant reaction mixture to vigorous mixing as in the first reaction zone at a temperature of at most 135° F. when the reaction is more than 60% complete, immediately passing the reaction mixture from said second reaction zone of vigorous mixing to a second cooling zone, withdrawing the cooled reaction mixture from said second cooling zone, separating air containing any unreacted sulfur trioxide from the reaction mixture, and thereafter neutralizing the reaction mixture.

13. A continuous process for substantially completely sulfonating an alcoholic hydroxyl, employing a diluted sulfur trioxide/air mixture, which comprises introducing into the first of at least two reaction zones, at a temperature of from about 85° F. to about 145° F., (1) a stream of said alcoholic hydroxyl compound and air, and (2) a stream of sulfur trioxide and air from which sulfur trioxide droplets and sulfuric acid mist are removed before said stream enters the first reaction zone, said stream of sulfur trioxide and air entering into the first reaction zone at a plurality of points at a temperature of about 90° F. to about 110° F., to produce a reaction mixture in said first reaction zone, vigorously mixing and maintaining said reaction mixture in said first reaction zone, for not more than about 10 seconds, in the form of a film thereof having a thickness of from .005 inch to about .040 inch, the said mixing being effected by conditions of high shear, removing said reaction mixture from said first reaction zone and immediately passing the same to a first cooling zone, introducing the cooled reaction mixture into a second reaction zone while simultaneously adding thereto a fresh stream of sulfur trioxide and air, subjecting the resultant reaction mixture to vigorous mixing at a temperature of at most 135° F. when the reaction is more than 60% complete, immediately passing the reaction mixture from said second reaction zone of vigorous mixing to a second cooling zone, withdrawing the cooled reaction mixture from said second cooling zone and separating air containing any unreacted sulfur trioxide from the reaction mixture, splitting the reaction mixture into two streams, recycling one of said streams of reaction mixture to the first reaction zone for cooling the reactants, and neutralizing the reaction mixture in the other of said streams.

14. A continuous process for substantially completely sulfonating an alcoholic hydroxyl, employing a diluted sulfur trioxide/air mixture, which comprises introducing into the first of at least two reaction zones, at a temperature of from about 85° F. to about 145° F., (1) a stream of said alcoholic hydroxyl compound and air, and (2) a stream of sulfur trioxide and air from which sulfur trioxide droplets and sulfuric acid mist are removed before said stream enters the first reaction zone, said stream of sulfur trioxide and air entering into the first reaction zone at a plurality of points at a temperature of about 90° F. to about 110° F., to produce a reaction mixture in said first reaction zone, vigorously mixing and maintaining said reaction mixture in said first reaction zone, for not more than about 10 seconds, in the form of a film thereof having a thickness of from .005 inch to about .040 inch, the said mixing being effected by conditions of high shear, removing said reaction mixture from said first reaction zone and immediately passing the said reaction mixture to a first cooling zone, withdrawing the cooled reaction mixture from said first cooling zone and separating air containing any unreacted sulfur trioxide from the reaction mixture, splitting the reaction mixture into two streams, recycling one of said streams of reaction mixture to the first reaction zone for cooling the reactants, introducing the other of said streams into a second reaction zone while simultaneously adding thereto a fresh stream of sulfur trioxide and air, subjecting the resultant reaction mixture to vigorous mixing as in the first reaction zone at a temperature of at most 135° F. when the reaction is more than 60% complete, immediately passing the reaction mixture from said second reaction zone of vigorous mixing to a second cooling zone, withdrawing the cooled reaction mixture from said second cooling zone and separating air containing any unreacted sulfur trioxide from the reaction mixture, and neutralizing the reaction mixture.

15. A continuous process for substantially completely sulfonating an alkyl aryl hydrocarbon having from 8 to 20 carbon atoms in the alkyl group, employing a diluted sulfur trioxide/air mixture, which comprises introducing into the first of at least two reaction zones, for reaction at a temperature from about 80° F. to about 200° F., (1) a stream of alkyl aryl hydrocarbon and air, and (2) a stream of sulfur trioxide and air, any mist containing sulfur trioxide droplets and sulfuric acid being removed from the sulfur trioxide/air mixture before said mixture enters the first reaction zone, said stream of sulfur trioxide/air mixture being entered at a plurality of points in the reaction zone at a temperature of about 90° F. to about 110° F., to produce a reaction mixture in said first reaction zone, vigorously mixing and maintaining said reaction mixture in said first reaction zone, for not more than about 10 seconds, in the form of a film thereof having a thickness of from .005 inch to about .040 inch, the said mixing being effected by conditions of high shear, removing said reaction mixture from said first reaction zone and immediately passing the said reaction mixture to a cooling zone, introducing the cooled reaction mixture into a second reaction zone while simultaneously adding thereto a fresh stream of sulfur trioxide and air, subjecting the resultant reaction mixture to vigorous mixing as in the first reaction zone at a temperature of at least 120° F. when the reaction is more than 60% complete, immediately passing the reaction mixture from said second reaction zone of vigorous mixing to a second cooling zone, withdrawing the cooled reaction mixture from said second cooling zone, separating air containing any unreacted sulfur trioxide from the reaction mixture, and permitting the cooled reaction mixture to digest while vigorously mixing the same.

16. The process of claim 15 wherein the reaction mixture, upon leaving the final mixing zone, is digested from 5 to 30 minutes at a temperature of at most about 130° F.

References Cited by the Examiner
UNITED STATES PATENTS

| | | | |
|---|---|---|---|
| 2,088,027 | 7/1937 | Law et al. | 260—459 |
| 2,187,244 | 1/1940 | Mills | 260—459 |
| 2,190,136 | 2/1940 | Oberg | 23—284 |
| 2,290,167 | 7/1942 | Datin | 260—459 |
| 2,448,184 | 8/1948 | Lemmon | 260—686 X |
| 2,613,218 | 10/1952 | Stoneman | 260—457 X |
| 2,676,185 | 4/1954 | Melstrom | 260—457 X |
| 2,691,040 | 10/1954 | Block et al. | 260—457 X |
| 2,693,479 | 11/1954 | Ross | 260—457 X |
| 2,697,031 | 12/1954 | Hervert | 23—284 |
| 2,768,199 | 10/1956 | Luntz et al. | 260—686 X |
| 2,828,331 | 3/1958 | Marisic et al. | 260—400 X |
| 2,863,912 | 12/1958 | Smith | 260—686 X |
| 2,931,822 | 4/1960 | Tischbirek | 260—686 X |
| 3,024,258 | 3/1962 | Brooks et al. | 260—459 X |
| 3,058,920 | 10/1962 | Brooks et al. | 260—686 |

FOREIGN PATENTS

| | | |
|---|---|---|
| 230,108 | 5/1959 | Australia. |
| 553,598 | 5/1943 | Great Britain. |
| 799,038 | 7/1958 | Great Britain. |
| 799,199 | 8/1958 | Great Britain. |

CHARLES B. PARKER, *Primary Examiner.*

F. D. HIGEL, *Assistant Examiner.*